US008036368B2

(12) United States Patent
Brunsgaard et al.

(10) Patent No.: US 8,036,368 B2
(45) Date of Patent: Oct. 11, 2011

(54) LOCAL ROUTE GROUPS AND TRANSFORMATION PATTERNS

(75) Inventors: Niels Brunsgaard, Boulder, CO (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1020 days.

(21) Appl. No.: 11/923,107

(22) Filed: Oct. 24, 2007

(65) Prior Publication Data

US 2009/0110180 A1      Apr. 30, 2009

(51) Int. Cl.
*H04M 7/00* (2006.01)
(52) U.S. Cl. ......................................... 379/232; 379/240
(58) Field of Classification Search .................... None
See application file for complete search history.

(56) References Cited

U.S. PATENT DOCUMENTS

| 6,847,634 | B1 | 1/2005 | Pearce et al. |
| 6,975,718 | B1 | 12/2005 | Pearce et al. |
| 2005/0147088 | A1 | 7/2005 | Bao et al. |
| 2007/0083918 | A1 | 4/2007 | Pearce et al. |

*Primary Examiner* — Harry Hong
(74) *Attorney, Agent, or Firm* — Fish & Richardson P.C.

(57) ABSTRACT

In one embodiment, method can include: receiving an address in a call agent, the address being associated with a call; triggering a trunk group selection algorithm in response to at least a portion of the received address, the trunk group selection algorithm providing a selection result from among a trunk group placeholder and a plurality of trunk groups; and forwarding the call to a trunk group determined by a caller-associated attribute when the selection result comprises the trunk group placeholder.

20 Claims, 6 Drawing Sheets

LOCAL ROUTE GROUPS AND TRANSFORMATION PATTERNS

TECHNICAL FIELD

The present disclosure relates generally to management and configuration of trunk groups for call routing.

BACKGROUND

Conventional early enterprise systems supported one public switched telephone network (PSTN) or "trunk" per phone. However, newer enterprise telephone systems typically support a far larger number of telephones and connections to the PSTN. As a result, end-users may no longer be guaranteed placement of their outbound calls because all available trunks may be in use by other callers.

Traditional private branch exchanges (PBXs) provide for bundling groups of trunks together in order to support outbound callers. Most PBXs utilize an approach whereby a call agent, upon receiving a call request from an enterprise user, searches through all trunk resources to find an available trunk to place the outbound call. Voice over Internet protocol (VoIP) technologies also support such "route group" approaches.

DESCRIPTION OF EXAMPLE EMBODIMENTS

Overview

Figure 1:
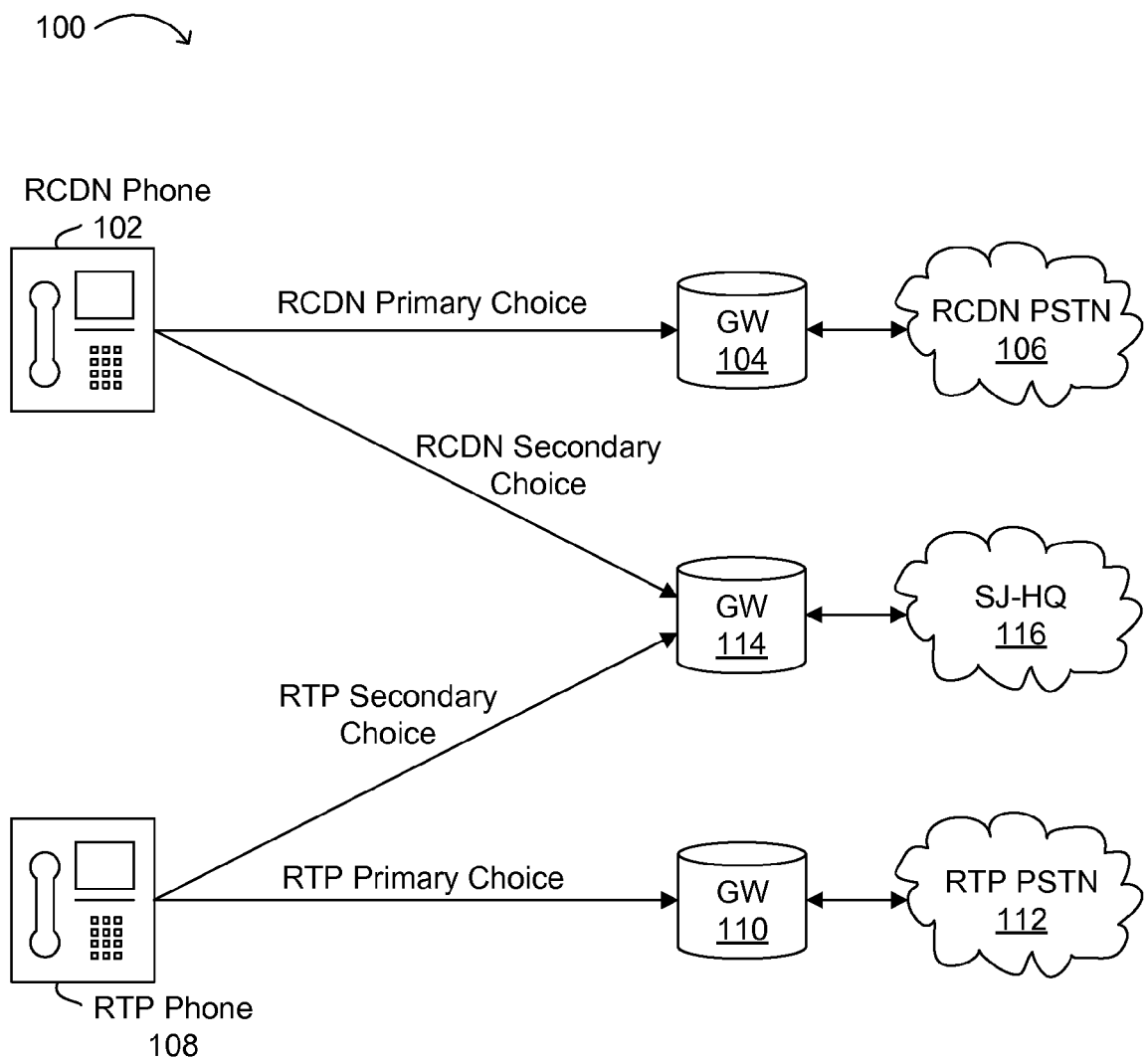
FIG. 1 illustrates an example static call routing configuration.

In one embodiment, a method can include: receiving an address in a call agent, the address being associated with a call; triggering a trunk group selection algorithm in response to at least a portion of the received address, the trunk group selection algorithm providing a selection result from among a trunk group placeholder and a plurality of trunk groups; and forwarding the call to a trunk group determined by a caller-associated attribute when the selection result comprises the trunk group placeholder.

Example Embodiments

In particular embodiments, an administrator can organize trunks into groups having similar characteristics. For example, trunks that connect to a public switched telephone network (PSTN) at a same attachment point, and which have the same PSTN rate plans, can be placed in the same group. Further, an administrator may be aware of which trunks are equivalent for routing purposes, and can simply place like trunks in the same group to form a "trunk group" or "route group." In particular embodiments, gateways coupled to the route groups may have a particular attribute (e.g., a geographic location attribute), and this attribute may be provided in a registration message sent from a phone to a call agent. Further, a call agent can automatically assign the gateways into groups containing gateways with similar or identical location attributes. Further, such attributes may be defined in a caller-associated configuration in the call agent.

Once trunks have been placed into named trunk groups, when a call agent (e.g., in the act of processing a call) determines that the trunk group is a candidate to handle the call, the call agent can attempt to select an available trunk from among those in the group to process the call. Traditionally, call agents provide "route pilots," "pilot points," or "route lists." In particular embodiments, a trunk group selection algorithm approach can include the administrator specifying a trunk group selection algorithm, which may include one or more predefined trunk groups. The administrator can specify or arrange trunk groups based on attributes, such as those trunks in a particular geographic location, those with a favorable route plan, or by considering any suitable attribute. However, the administrator may also specify that the trunk group selection algorithm contain not strictly a predefined trunk group, but rather a "trunk group placeholder" that can represent a specific trunk group, or a "local route group" that may be associated with the caller or a group of callers.

In this fashion, a caller-associated trunk group placeholder can be utilized in particular embodiments to provide a dynamic search order based on caller-associated attributes. Accordingly, such a trunk group in the placeholder may not be a static group, but rather a command to the trunk group selection algorithm to offer the call to a personal trunk group specifically provisioned by the administrator for the caller. Further, such a caller-specific trunk group placeholder can coexist with other fixed trunk groups in a "hunt" algorithm. For example, a call routing pattern can include: (i) if the caller is dialing a particular area code for which the administrator has a predefined route group, then offer the call to that route group by name; (ii) otherwise, use the trunk group placeholder to offer the call to a trunk group that contains trunks that are, most likely, attached to the part of the PSTN that normally serves the caller; and (iii) otherwise, fail over to a specific centralized predefined trunk group, likely in a central campus location.

In particular embodiments, once the trunk group selection algorithm is triggered, then the call agent can, when the placeholder is encountered, offer the call to a local trunk group assigned to the caller. To trigger the trunk group selection algorithm, the administrator can bind some sort of dialable address (e.g., a pattern or portion of a received address) to the algorithm. For example, such a pattern or address can be a standard numeric pattern, an Internet URL with a numeric component, or any suitable addressing mechanism/approach.

For each trunk group selection algorithm, the administrator can define dialable addresses to permit callers to select these algorithms when they need to place calls to the PSTN. These addresses may represent, directly or indirectly, numbers in the PSTN that callers may wish to dial. When a caller provides digits, the call agent can select a matching address, and execute the associated trunk group selection algorithm.

However, because the provided digits may not exactly match or be compatible with what the PSTN for the selected trunk expects, the administrator can provision (e.g., on a gateway-by-gateway basis) a set of transformation rules that can convert numbers, as dialed by all possible callers into a canonical format that the PSTN connected at the gateway expects. Further, the administrator, optionally for each caller defined in a system, can specify a trunk group that the trunk group selection algorithm should use when encountering the caller-specific trunk group placeholder.

In particular embodiments, a call agent that is provided information about a calling device (e.g., its IP address or a location string) can use this information to dynamically provision a trunk group for that caller. This allows the routing behavior for a caller to dynamically change as the caller moves around a network served by a given call agent.

Generally, particular embodiments relate to an abstract ordering, as opposed to a fixed matrix of trunk group searches. For example, such fixed matrices (e.g., those in static form) can include first call attempts (i.e., primary choices) to groups associated with a particular area code, then groups associated with the area code of the originating call, followed by gateways in a central location (i.e., secondary, tertiary, etc., choices) associated neither with the dialed area code nor the area code of the originating call. This type of call flow may generally be known as "toll bypass."

In particular embodiments, each route group may be assigned a specific branch (e.g., area code) that it serves, and each caller may be assigned a specific branch. Further, the administrator, in addition to being able to configure fixed associations in call routing search orders, can also specify a local "placeholder" with the trunk group selection algorithm search. Then, when a call agent encounters an element in the search that indicates the trunk group placeholder should be used, the call agent may look at a location or other suitable attribute associated with the caller, and then dynamically search through trunk groups configured for that location. In this fashion, a trunk group to which a call can be forwarded from a call agent may be determined using a caller-associated attribute.

Accordingly, the amount of configuration needed to represent toll bypass relationships in particular embodiments may be drastically reduced. For example, Table 1 below shows an example matrix for toll bypass routes in particular embodiments.

TABLE 1

| Calls from anywhere to: | |
|---|---|
| 408 area code | Try San Jose group, then trunk group placeholder |
| 214 area code | Try Dallas group, then trunk group placeholder |
| 919 area code | Try RTP group, then trunk group placeholder |
| 978 area code | Try Boxborough group, then trunk group placeholder |

Further, as the number of sites grows, the configuration of the static method expands geometrically, while a trunk group placeholder or local route group approach as in particular embodiments may only expand linearly.

In addition, a local outdial configuration may permit effective utilization of centralized gateways when no gateways local to the caller are available. In static configurations, local calls from a given location may first use a group associated with that location, and then a group associated with a centralized gateway if the local group has already been fully utilized. However, trunk group placeholders can allow for local calls from anywhere to first try a local group, followed by a group associated with a centralized gateway.

In particular embodiments, local route groups may also provide for transformation patterns related to numbering plan variations from region to region. When trunks are attached to different areas of the PSTN, digits as dialed by an enterprise user may need to be modified before being offered to the PSTN. For example, if Dallas is in a 7-digit dialing area, a user from San Jose upon viewing a Dallas number, may actually dial this number as a 12-digit number (e.g., 9-1-214-XXX-XXXX). If the "9" were stripped from this digit string, and the call were offered to the trunk in San Jose, the call may route across the PSTN correctly. However, these same digits as offered to the Dallas trunk may cause the caller to receive an error message because the initial "1" and "214" area codes in this particular example need not be presented to the Dallas PSTN.

Many voice over Internet protocol (VoIP) systems in static configurations can permit the types of transformations required to perform such number manipulation. However, some such transformations may be performed on the static association between the dial plan and the trunk groups. Thus, when the call is offered to the San Jose trunk group from the "9-1-214-XXX-XXXX" pattern, the "9" may be stripped, but when the call is offered to the Dallas trunk group from the "9-1-214-XXX-XXXX" pattern, the "9-1-214" portion may be stripped.

In particular embodiments, trunk group placeholders may be "free-floating" such that there is no fixed association between any local tag route group and the dial pattern that selects that local group. Thus, one may not be able to define route-by-route transformations to perform this type of manipulation because there may be no static configuration on which to base the transformation rules. Also in particular embodiments, manipulation commands may be placed directly on the trunks such that, in the absence of any fixed route, the trunks can become the place from which numerical or alphanumerical transformations may be applied. Also in particular embodiments, such transformations may be context-sensitive in order to define a table of transformations, and to apply transformations corresponding to the dialed digits.

Figure 2:
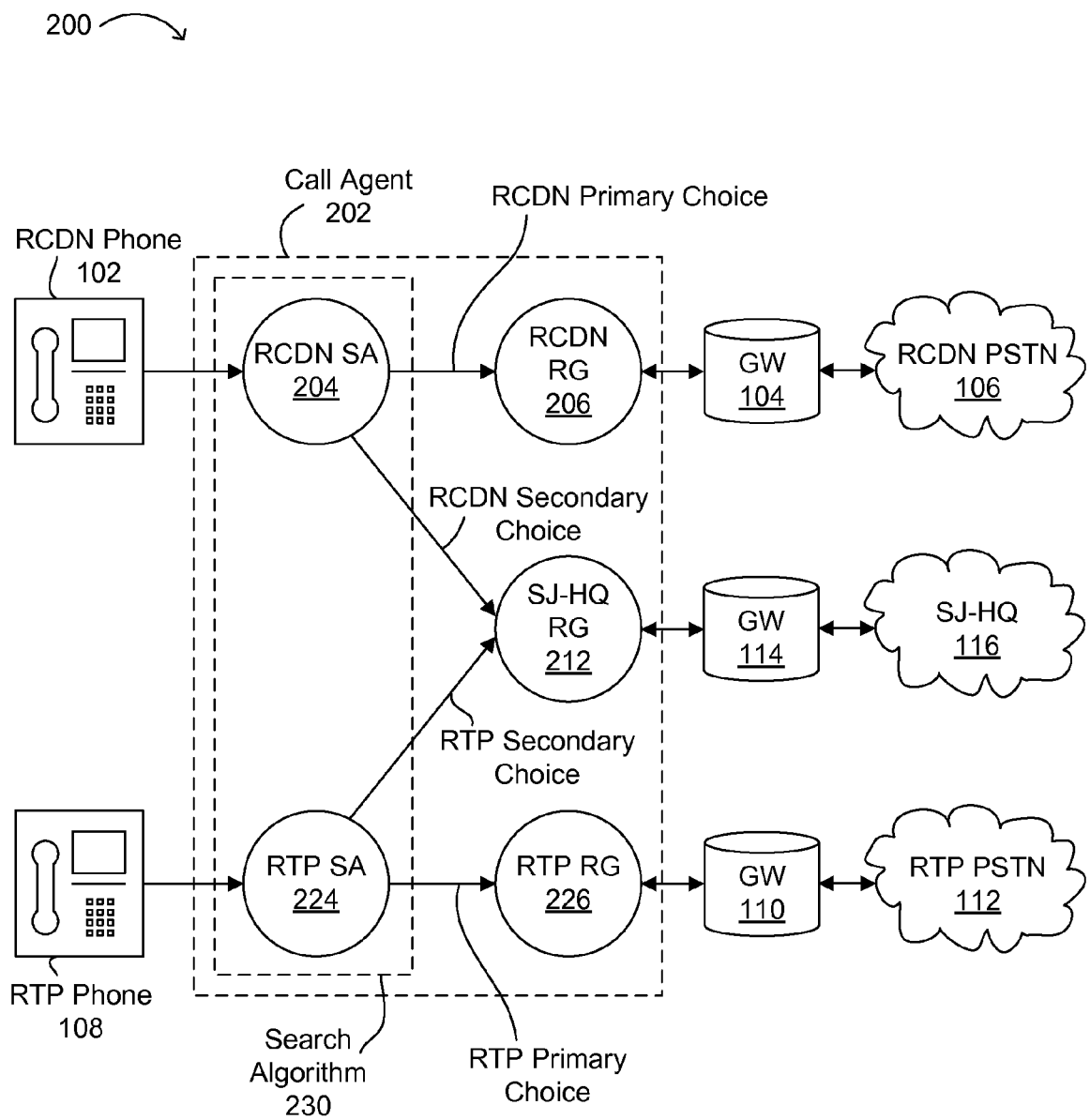
FIG. 2 illustrates an example configuration with a call agent supporting static call routing.

FIGS. 1 and 2 below represent typical reference configurations. Referring now to FIG. 1, an example static call routing configuration is shown and indicated by the general reference character 100. Richardson (RCDN) phone 102 can place a call to a call agent having a static priority ordering. In this example, a primary choice for the call can be via gateway (GW) 104 to RCDN PSTN 106, while a secondary choice can be via GW 114 to San Jose headquarters (SJ-HQ) 116. For example, a "gateway" herein can be a router configured as a voice gateway. In this example, Research Triangle Park (RTP) phone 108 can similarly place a call to the call agent, and a primary choice for routing may be via GW 110 to RTP PSTN 112, while a secondary choice for this call may be via GW 114 to SJ-HQ 116. Thus, a call agent or other routing path specifier can include a static ordering of gateways for incoming calls.

Referring now to FIG. 2, an example configuration with a call agent supporting static call routing is shown and indicated by the general reference character 200. For example, a "call agent" can be a server, a single processor, or a distributed set of processors or servers, that can be provisioned with rules for call routing. In static provisioning, a designated priority order for gateways to which incoming calls can be routed is predetermined in the configuration of the call agent. Thus, an associated search algorithm contains an explicit list or ordering of route groups for call forwarding to gateways associated therewith. In this example, call agent 202 can include search algorithm 230 coupled to a plurality of route groups (RG), such as RCDN RG 206, SJ-HQ RG 212, and RTP RG 226.

Search algorithm 230 can receive incoming calls with the associated addresses or numbers. Further, search algorithm 230 may be distributed among different locations. For example, RCDN phone 102 can provide an address or number to RCDN SA 204, which can include a static configuration of route groups for forwarding. The search algorithm RCDN SA 204 can thus designate the RCDN primary choice as RCDN RG 206 for forwarding the call via GW 104 to RCDN PSTN 106, with a secondary choice of SJ-HQ RG 212 for forwarding via GW 114 to SJ-HQ 116. Similarly, RTP phone 108 can provide an address or number to RTP SA 224, with a primary routing choice being RTP RG 226 for forwarding via GW 110 to RTP PSTN 112, and a secondary routing choice being SJ-HQ RG 212 for forwarding via router 114 to SJ-HQ 116.

In this fashion, search algorithms can be used to select a route group, where each route group is tied to a physical location. The selection algorithm and associated route groups may be provisioned in a call agent. Further, associated gateways for call forwarding may not necessarily be separated from the call agent, but can in some cases be integrated therewith. In this fashion, particular route groups for attempted call routing, and in what order, can be statically designated in a call agent.

Generally in such a static approach, an administrator may explicitly configure each gateway or router in static algorithms, such that 500 sites may equal 500 gateways. For every site, the administrator may configure a route group containing the site gateways, such that, e.g., 500 sites equals 500 route groups. On a site-by-site basis, for every gateway search pattern (e.g., central-to-local or remote-to-local), the administrator may configure a route list, however this may not scale (e.g., 500 sites×500 patterns=250,000 route lists). Further, on a site-by-site basis, for every dialable pattern for which route lists are used, the administrator may configure a translation pattern, however this may not scale (e.g., 500 sites×500 patterns=250,000 route patterns). In particular embodiments, route lists can contain a dynamic route group selected based on a caller's location or other suitable attribute, such that a number of route patterns/entries would be far fewer.

In particular embodiments, when calls are offered to different geographical regions, the address (e.g., phone number, or portion thereof) may be modified to accommodate a destination PSTN. Thus, a "9" digit dialed may be stripped in some cases (e.g., when an RTP originated call is passed through RTP RG 226) as part of a primary routing choice, but an additional step of adding a "1" digit may occur in this example when routing via the secondary choice SJ-HQ RG 212. In this fashion, the call may be routed properly by changing or localizing the called number for compatibility with a corresponding destination network.

As another example, if there is a combination of a toll bypass configuration and a local outdial configuration, and a Dallas trunk group is in both the local outdial search order (for Dallas callers), as well as a San Jose toll bypass search order, RTP callers may dial "9-1-214-XXX-XXXX" to reach a Dallas destination. For a 7-digit Dallas dialing area, Dallas users may dial patterns like "9-NXX-XXXX" to reach Dallas destinations. In local route groups, there may be a single Dallas route group utilized by both search orders. Toward this end, transformation tables may be defined on the trunk group (e.g., in Dallas). Calls that are processed through the Dallas route group may be compared against a table of patterns. For example, Table 2 below shows such a comparison table.

TABLE 2

| Pattern Table | |
|---|---|
| 9-NXX-XXXX | Strip "9" |
| 9-1-214-XXX-XXXX | Strip "9-1-214" |

The digits for local outdial calls can match the first pattern and cause the "9" to be stripped. The digits for toll bypass calls can match the second pattern and cause the "9-1-214" to be stripped. In both cases, the proper 7-digit pattern may be sent to the Dallas PSTN. Thus in one particular example using "predots," for a called number of "91.214 555 1212" via bypass, the predot, as well as prefix "1" can be discarded in sending to SJ-HQ RG 506 for forwarding via gateway/router to SJ-HQ. Also, for a called number of "9.408 555 1212" via outdial, the predot may be discarded, but not the prefix en route to SJ-HQ RG for forwarding via router to SJ-HQ. Accordingly, route groups may be reused across route lists, and depending on which route list the call goes through, different numerical transformations may be applied.

Figure 3:
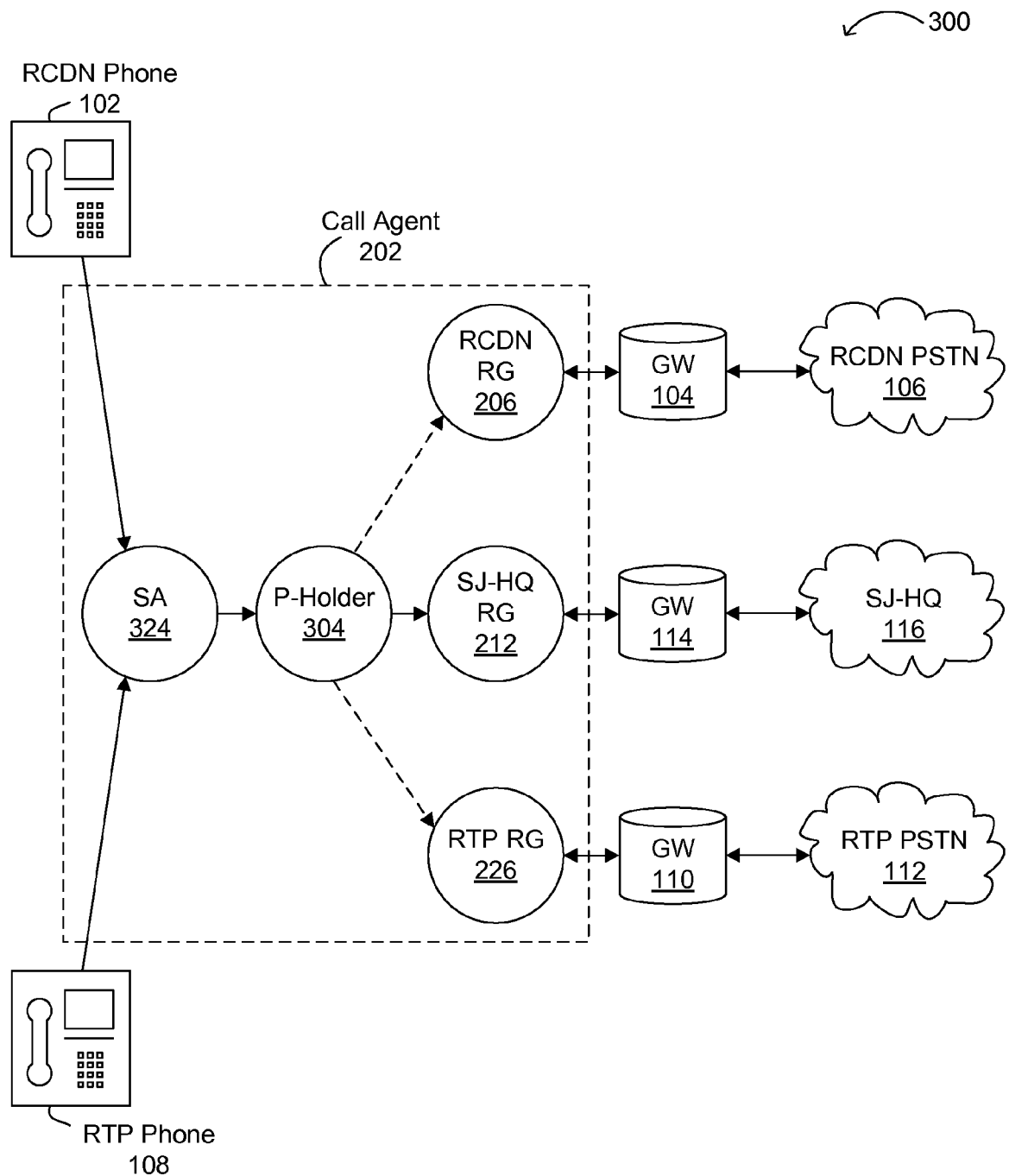
FIG. 3 illustrates an example configuration using trunk group placeholders.

Referring now to FIG. 3, an example configuration using trunk group placeholders is shown and indicated by the general reference character 300. Here, call agent 202 can include selection algorithm (SA) 324, trunk group placeholder 304, and a plurality of route groups (e.g., 206, 212, and 226). In particular embodiments, selection algorithm 324 can be provisioned with a configuration related to a caller, and may be stored in a call agent (e.g., 202) of a phone service provider. Such configurations related to a caller may be caller-specific or caller-associated attributes like location attributes or call routing plan attributes. The caller-associated attributes can be used to define a route group that should be used when a placeholder (e.g., 304) is encountered. Thus, a directive to use such caller-associated attributes can provide enhanced flexibility and scalability relative to a statically designated list (e.g., of the type discussed above with reference to FIG. 2).

In the example of FIG. 3, a call from RCDN phone 102 can be received at SA 324, which based on the algorithm, may then encounter placeholder 304. Placeholder 304 can consider caller-associated attributes (e.g., location=RCDN) related to RCDN phone 102, and may accordingly forward the call to a primary choice of RCDN RG 206 to GW 104 and RCDN PSTN 106, with a secondary choice of SJ-HQ RG 212 to GW 114 and SJ-HQ 116. The primary route group choice for RCDN phone 102 may be designated in the phone configuration accessible in call agent 202. Similarly, a call originating from RTP phone 108 can be received in SA 324, and placeholder 304 can consider caller-associated attributes (e.g., location=RTP) related to RTP phone 108, and may accordingly forward the call to a primary choice of RTP RG 226 (e.g., as designated in the phone configuration for RTP phone 108) to GW 110 and RTP PSTN 112, with a secondary choice of SJ-HQ RG 212 to GW 114 and SJ-HQ 116.

In particular embodiments, gatekeepers or centralized route plan analyzers can also be utilized to route calls on a network to other phones managed by different caller agents. Such gatekeepers can also include rejection logic to indicate to a search algorithm (e.g., via a route group) that a particular call is off-network. As will be discussed in more detail below with reference to FIG. 5, both local outdial and toll bypass can be supported using such gatekeepers. In particular, rejection logic can be utilized to convey to the search algorithm that another path for routing should be taken to service a particular call.

Figure 4:
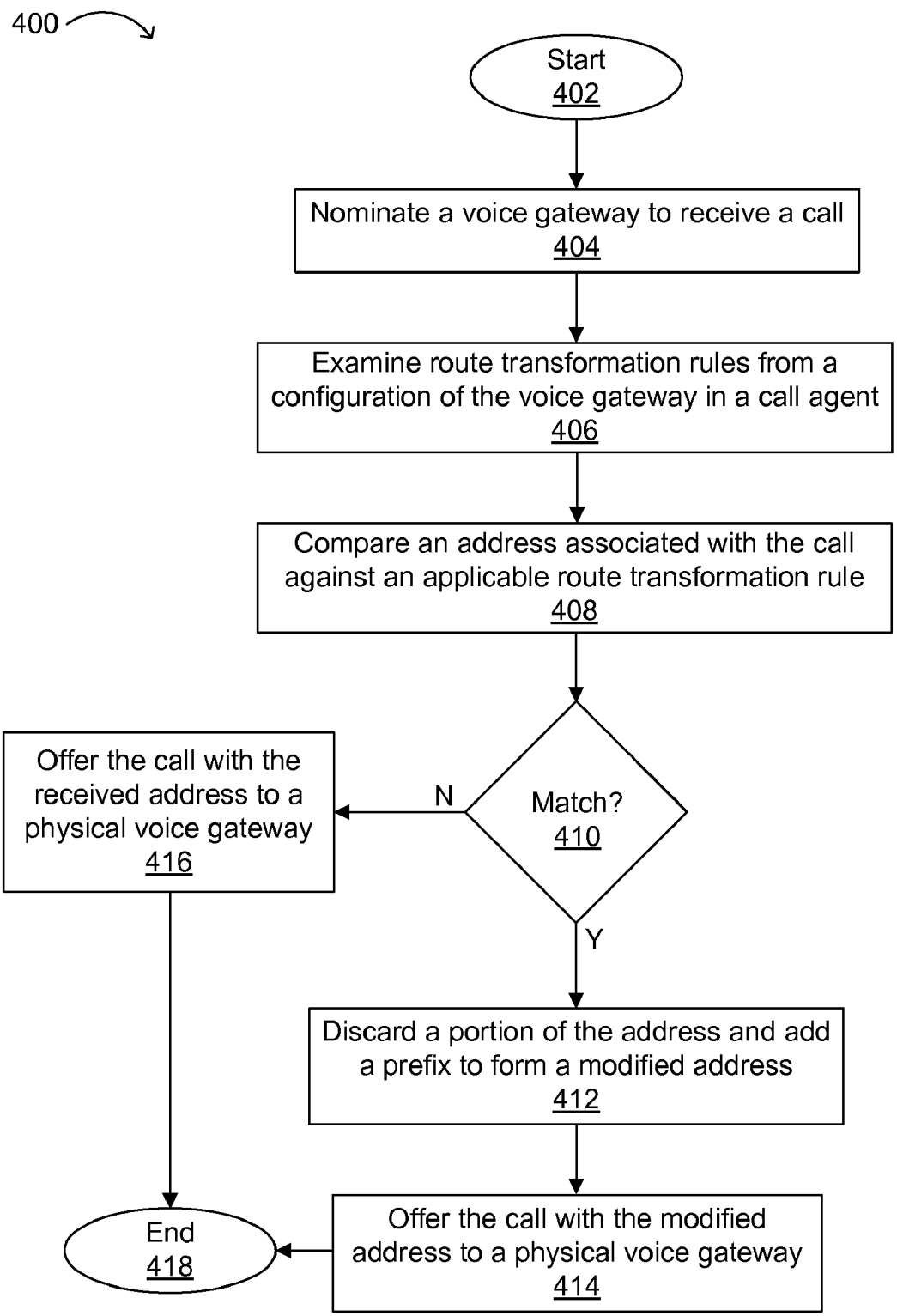
FIG. 4 illustrates a flow diagram of an example method of transforming patterns in a local route group approach.

Referring now to FIG. 4, a flow diagram of an example method of transforming patterns in a local route group approach is shown and indicated by the general reference character 400. The flow can begin (402), and a voice gateway may be nominated to receive a call (404). Next, route transformation rules from a configuration of the voice gateway in a call agent can be examined (406). For example, for a called number of "682000" a first portion can include "68" where the transformation rules can be configured for "68.XXXX". The address or called number can be compared against an applicable route transformation rule (408). If there is no match (410), no change to the address can be made, and the call can be offered with the received address to a physical voice gateway (416), completing the flow (418).

If there is a match (410), such as "68" matching the predetermined number, the predot (e.g., part of the pattern before the ".") can be discarded, and a prefix can be added to the called number (412), and the call can be offered with the modified address to a physical voice gateway (414), completing the call (418). For example, a called number of "682000" can have a portion "68" compared against a predetermined number for a match indication, where a match results in a discarding of any predot pattern, as well as the adding of a prefix (e.g., "1408525"), resulting in a modified called number "14085252000". In another example, a called number of "672000" can have a portion "67" compared against a predetermined number for a match indication, where a match results in a discarding of any predot pattern, as well as the adding of a prefix (e.g., "1919392"), resulting in a modified called number "19193922000".

Figure 5:
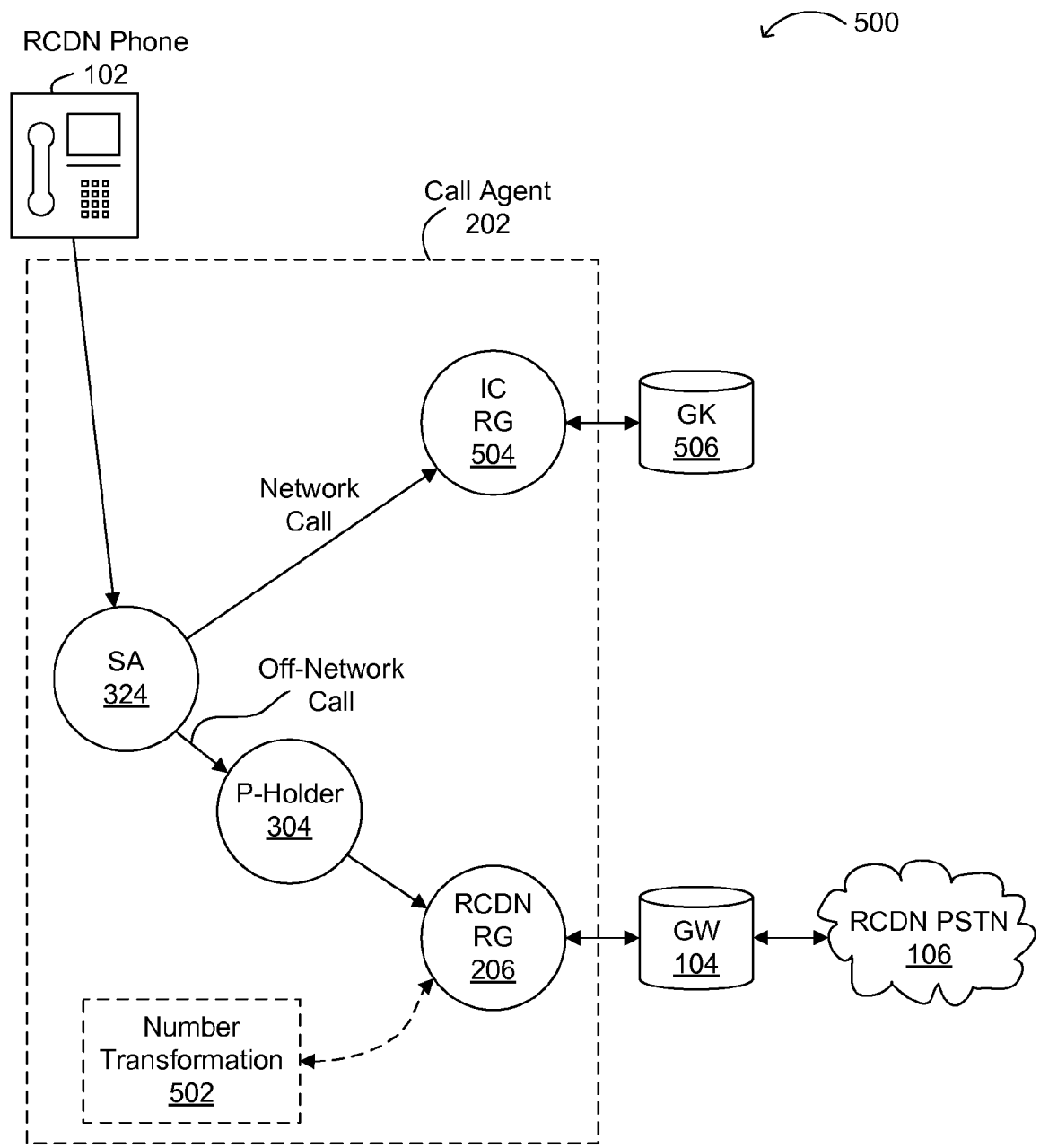
FIG. 5 illustrates an example local outdial configuration for local route groups using number transformation.

Referring now to FIG. 5, an example local outdial configuration for local route groups using number transformation is shown and indicated by the general reference character 500. Calls from RCDN phone 102 can be received in call agent 202 via SA 324. A first attempt for routing an on-network call can be via inter-cluster (IC) gatekeeper (GK) 506. However, if the call is not suitable for the network protected by GK 506, rejection logic can indicate to SA 324 (e.g., via IC RG 504) that a particular call is off-network. In this case, the off-network call can be sent to trunk group placeholder 304. In particular embodiments, encountering the trunk group placeholder 304 can result in consideration of caller-associated attributes attained via configurations for RCDN phone 102 in call agent 202.

In this example, a location attribute associated with RCDN phone 102 can indicate a local route group of RCDN RG 206. Thus, the call can be forwarded to RCDN RG 206 for routing to RCDN PSTN 106 via GW 104. In addition, if a particular address or called number is not compatible with RCDN PSTN 106, number transformation 502 can be activated to provide a modified address. In this case, the call can be forwarded to GW 104 with a modified address that is suitable for RCDN PSTN 106. In this fashion, a local placeholder (e.g., trunk group placeholder 304) can essentially look at a caller having "RCDN" as a route group, and then appropriately forward the call to RCDN PSTN 106.

Figure 6:
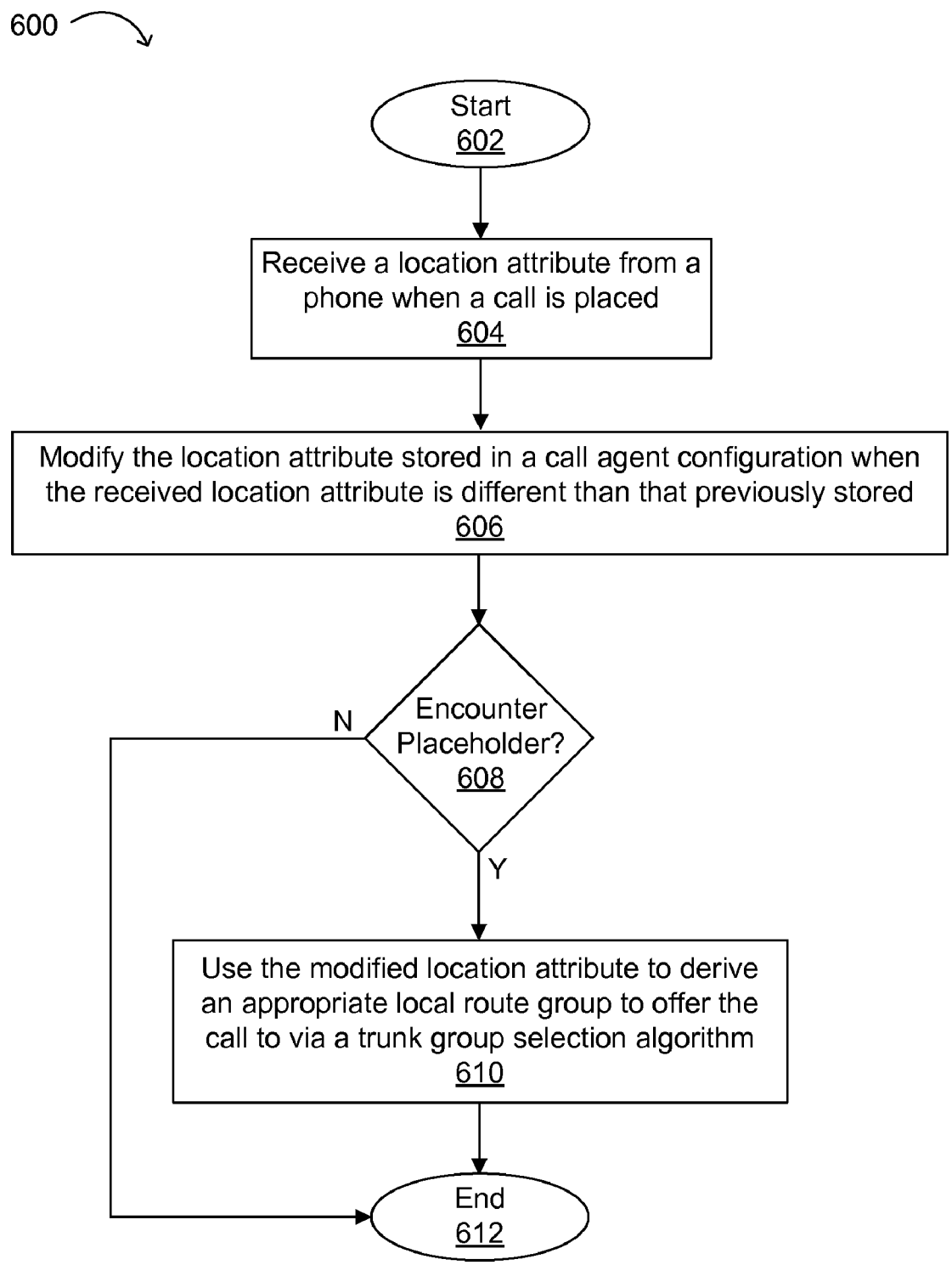
FIG. 6 illustrates a flow diagram of an example method of dynamically configuring a local route group.

Referring now to FIG. 6, a flow diagram of an example method of dynamically configuring a local route group is shown and indicated by the general reference character 600. The flow can begin (602), and a location and/or other suitable attribute can be received from a phone when a call is placed (604). Such a location attribute stored in a call agent configuration can be modified when the received location attribute is different from what is currently stored (606). When a trunk group placeholder is encountered (608), the modified location attribute can then be used to derive an appropriate local route group for the call via a trunk group selection algorithm (610), and the flow can complete (612).

Also in particular embodiments, an administrator can compile a list of PSTN gateways that an associated call agent manages. Different PSTN gateways can connect to different parts of a given PSTN. For example, different parts of a PSTN can support slightly different dialing plans, such as 7-digit versus 10-digit local dialing, and the PSTN parts can offer different rates for calls to the same destination (e.g., 1-408-432-4321 is a toll call when placed through a Dallas gateway, but the same destination, dialed as 408-432-4321 is a free local call when placed through a San Jose gateway).

Although the description has been described with respect to particular embodiments thereof, these particular embodiments are merely illustrative, and not restrictive. For example, while particular numerical transformations and system arrangements have been described, other types of transformations can also be supported in particular embodiments. Also, while certain types of networks, such as PSTN, have been described, other types of networks, such as PBX, or any suitable network, can also be accommodated in particular embodiments. Further, military defense networks (DSNs) and VoIP providers of wholesale network services can also be accommodated in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, comprising:
   receiving an address in a call agent, the address being associated with a call;
   triggering a trunk group selection algorithm in response to at least a portion of the received address, the trunk group selection algorithm providing a selection result from among a trunk group placeholder and a plurality of trunk groups; and
   forwarding the call to a trunk group determined by a caller-associated attribute when the selection result comprises the trunk group placeholder.

2. The method of claim 1, further comprising transforming the received address to a modified address associated with the call when the received address is incompatible with the selection result.

3. The method of claim 2, wherein the transforming the received address comprises:
   comparing a first portion of the received address against a predetermined value to provide a match result; and
   discarding the first portion and adding a prefix to the received address in response to the match result.

4. The method of claim 1, wherein the receiving the address comprises using voice over Internet protocol (VoIP).

5. The method of claim 1, wherein the selection result is determined by selecting among a predetermined order of one or more of the plurality of trunk groups.

6. The method of claim 1, wherein the caller-associated attribute comprises geographic location.

7. The method of claim 1, wherein the caller-associated attribute comprises a favorable route plan.

8. The method of claim 1, wherein the caller-associated attribute comprises a caller group identification.

9. The method of claim 1, wherein the address comprises a numerical pattern.

10. The method of claim 1, wherein the forwarding the call comprises using a public switched telephone network (PSTN) or a private branch exchange (PBX).

11. The method of claim 1, further comprising assigning a plurality of gateways into the plurality of trunk groups.

12. An apparatus, comprising:
    one or more processors; and
    logic encoded in one or more tangible media for execution on the one or more processors, and when executed operable to:
    receive an address in a call agent, the address being associated with a call;
    trigger a trunk group selection algorithm in response to at least a portion of the received address, the trunk group selection algorithm providing a selection result from among a trunk group placeholder and a plurality of trunk groups; and
    forward the call to a trunk group determined by a caller-associated attribute when the selection result comprises the trunk group placeholder.

13. The apparatus of claim 12, wherein the logic is further operable when executed to transform the received address to a modified address associated with the call when the received address is incompatible with the selection result.

14. The apparatus of claim 13, wherein the transform of the received address comprises logic when executed to:
    compare a first portion of the received address against a predetermined value to provide a match result; and
    discard the first portion and adding a prefix to the received address in response to the match result.

15. The apparatus of claim 12, wherein the address is received using voice over Internet protocol (VoIP).

16. The apparatus of claim 12, wherein the selection result is determined by selecting among a predetermined order of one or more of the plurality of trunk groups.

17. The apparatus of claim 12, wherein the caller-associated attribute comprises geographic location.

18. The apparatus of claim 12, wherein the caller-associated attribute comprises a favorable route plan.

19. The apparatus of claim 12, wherein the address comprises a numerical pattern.

20. An apparatus, comprising:
    means for receiving an address in a call agent, the address being associated with a call;
    means for triggering a trunk group selection algorithm in response to at least a portion of the received address, the trunk group selection algorithm providing a selection result from among a trunk group placeholder and a plurality of trunk groups; and
    means for forwarding the call to a trunk group determined by a caller-associated attribute when the selection result comprises the trunk group placeholder.

* * * * *